S. PINANSKI.
PROJECTION SCREEN LIGHTING.
APPLICATION FILED MAR. 17, 1922.
1,437,442.
Patented Dec. 5, 1922.
3 SHEETS—SHEET 1.
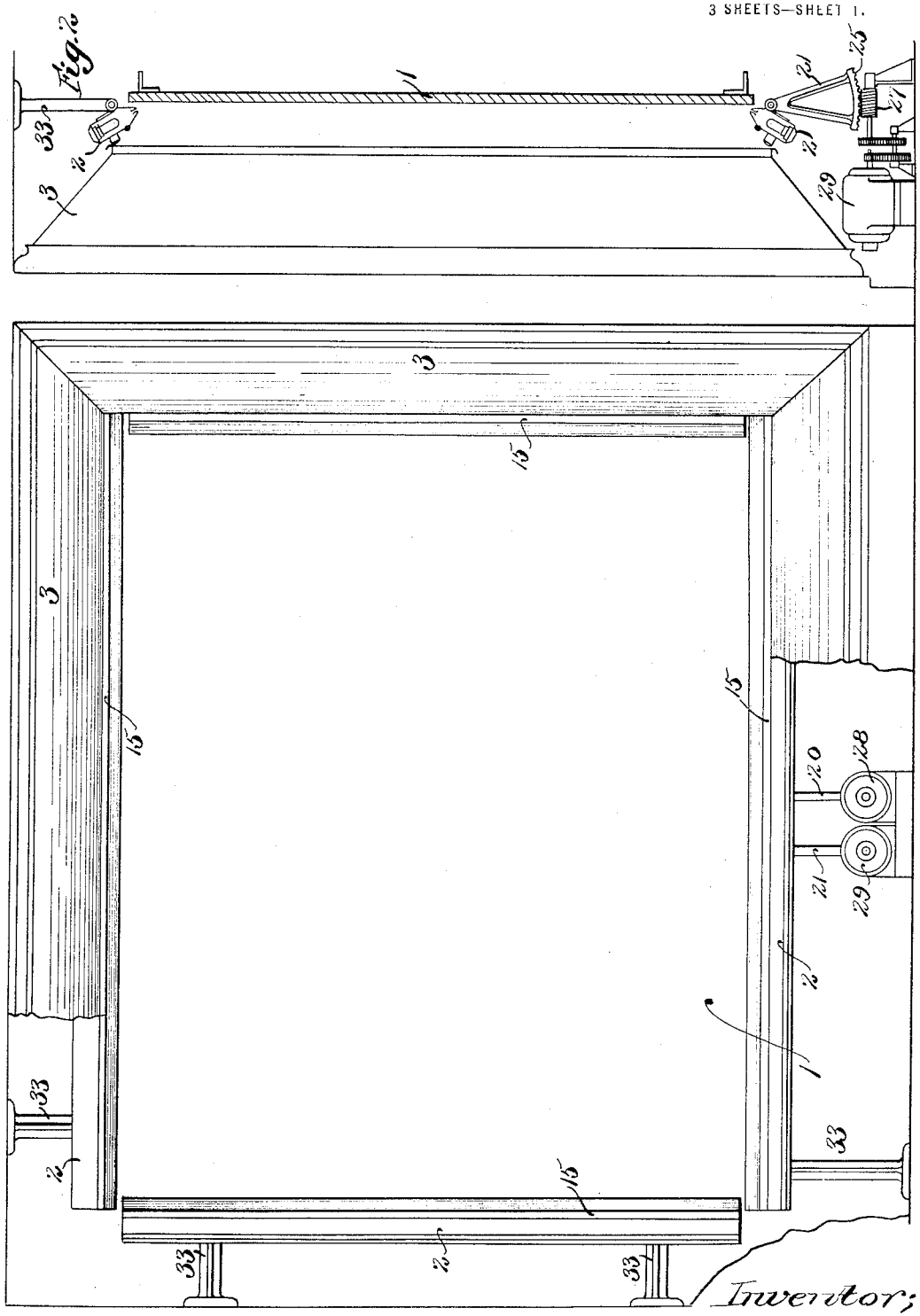
Inventor;
Samuel Pinanski,
by Roberts Roberts & Cushman
his att'ys.

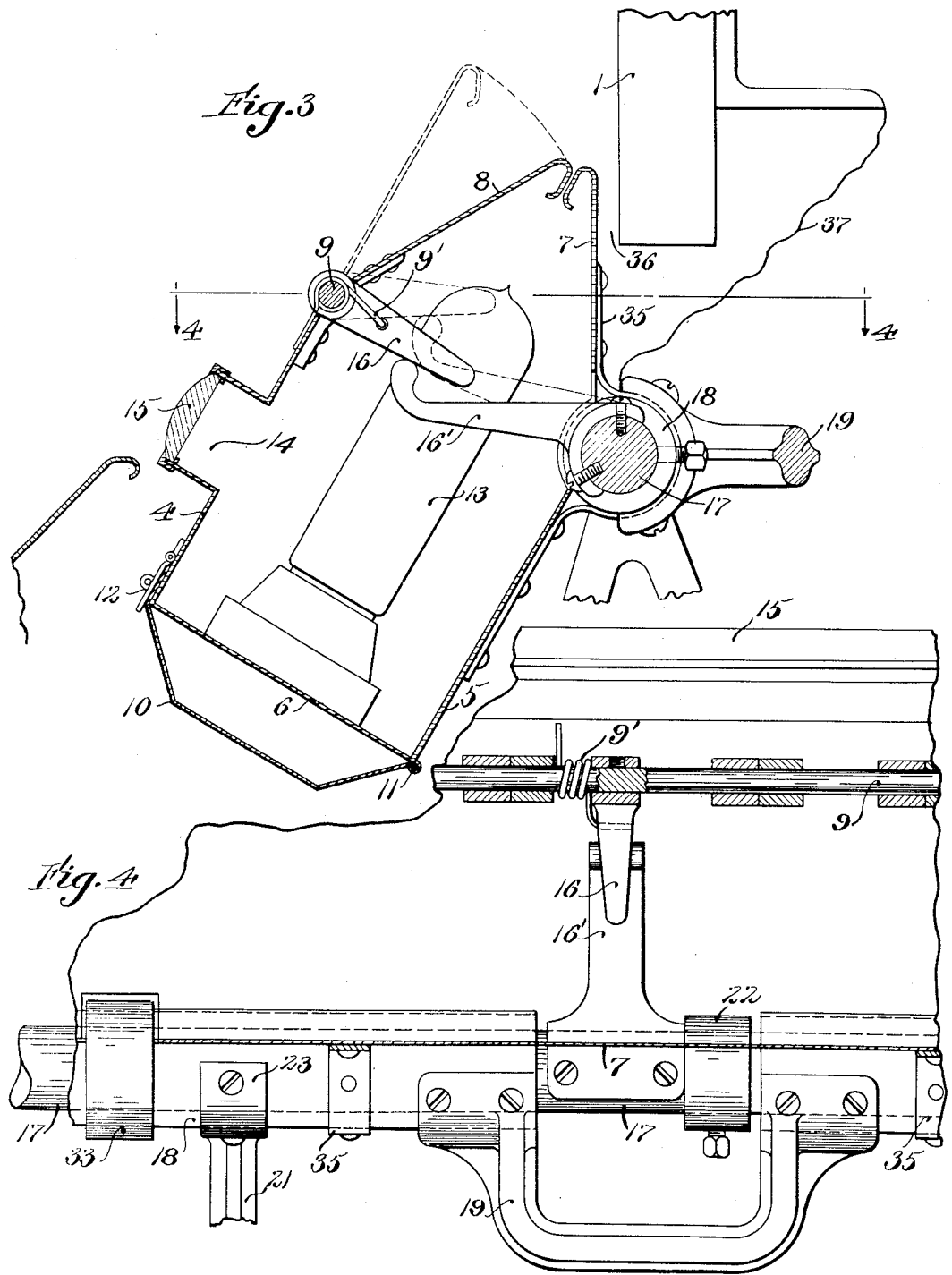

S. PINANSKI.
PROJECTION SCREEN LIGHTING.
APPLICATION FILED MAR. 17, 1922.
1,437,442. Patented Dec. 5, 1922.
3 SHEETS—SHEET 3.
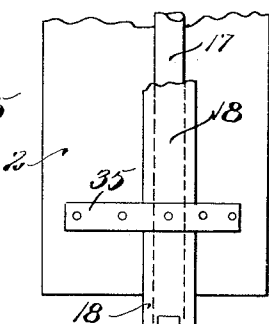
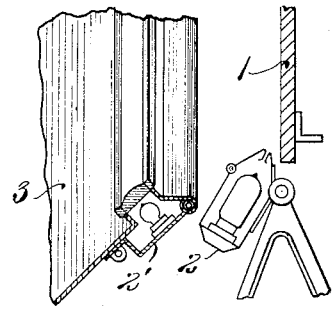
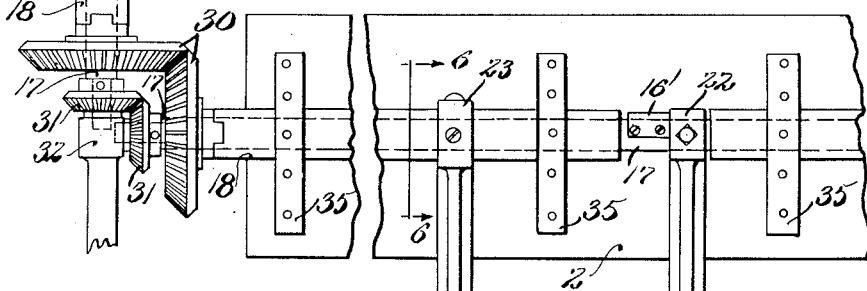
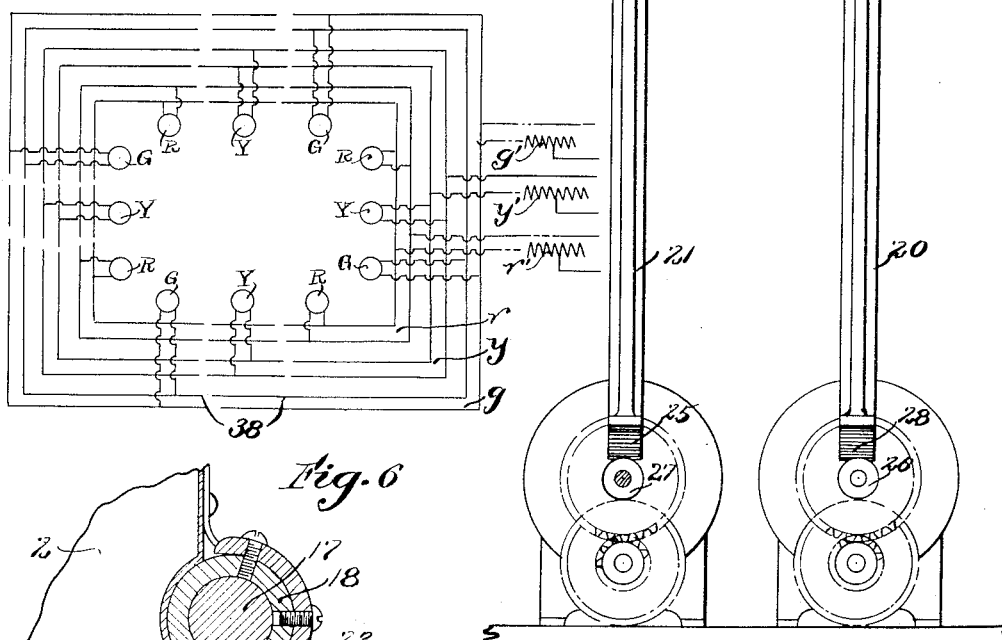
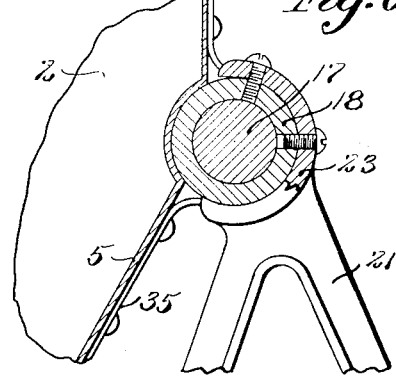
Inventor;
Samuel Pinanski,
by Roberts, Roberts & Cushman
his attys.

Patented Dec. 5, 1922.

1,437,442

UNITED STATES PATENT OFFICE.

SAMUEL PINANSKI, OF BOSTON, MASSACHUSETTS.

PROJECTION-SCREEN LIGHTING.

Application filed March 17, 1922. Serial No. 544,394.

*To all whom it may concern:*

Be it known that I, SAMUEL PINANSKI, a citizen of the United States of America, and resident of Boston, in the county of Suffolk and State of Massachusetts, have invented new and useful Improvements in Projection-Screen Lighting, of which the following is a specification.

In the projection of either still or motion pictures on a screen there is ordinarily a marked flatness and lack of perspective due to the fact that the pictures are taken from a single point of view, the effect being similar to viewing a scene with one eye closed. Moreover, projected pictures do not adequately reproduce the scenes depicted inasmuch as pictures are wholly devoid of color and the different parts of the scene, while they may be full of different colors, are reproduced merely in black and white and different shades of gray.

The objects of the present invention are to minimize the aforesaid defects, to add to the appearance of perspective, to subdue the portions of the projected pictures which are of minor interest thereby to center attention on the portions of principal interest, and to color portions of the pictures selectively depending upon the objects represented therein.

In one aspect the invention comprises enhancing the artistic effect of pictures projected upon a screen by suffusing light over portions of the pictures on the screen, the light being either ordinary white or yellow light or being colored to suit portions of the pictures over which it is suffused. In a more specific aspect the invention involves suffusing the light over the margins of the pictures, these portions usually representing the background of a scene or other parts of minor interest, and when confining the light to the margins it is preferably directed onto the screen obliquely from the margins toward the center. The invention also involves varying either the intensity, the obliquity, the distribution or the color of the light to suit successive pictures, the means for controlling the light preferably being located at a distance from the screen as for example in the operator's booth.

The means for carrying out the present invention may take various forms, but it preferably comprises a light housing extending along the margin of the picture area of the screen, the housing having a window directed toward the picture area, together with lights distributed along the margin of the picture area within the housing. The lights may comprise rows of incandescent bulbs and the colors may be varied by providing a plurality of series of bulbs of different colors. For example, the bulbs may be arranged in a single row and vary in color in regular sequence, every third bulb being red, yellow and green respectively. The housing is preferably movably mounted so that it may be tipped at various angles relatively to the screen or otherwise moved to direct the light to the screen as desired. The housing may be further provided with a shutter to vary the amount and direction of the light issuing from the housing. The housing may extend continuously around the four sides of the picture screen, but the housing is preferably divided into four or more parts. For example, one part may extend continuously along each of the four sides, or the part extending along one or more of the four sides may be divided into a plurality of sections so that the sections may be controlled separately.

The light housing is also preferably provided with a light slot spaced outwardly from the margin of the picture area and extending entirely around the screen so that light will radiate therethrough and give the appearance of a light border surrounding the picture and separated therefrom by a dark area. Instead of locating the light slot in the said housing it may be in a separate housing with separate lights so that its effect may be controlled independently.

In order to illustrate the nature of the invention I have shown one concrete embodiment in the accompanying drawings, in which,—

Figure 1 is a front view of the apparatus;

Figure 2 is a vertical central section of the apparatus;

Figure 3 is an enlarged detail section showing the light housing and its support;

Figure 4 is a section on line 4—4 of Fig. 3;

Figure 5 is an enlarged detail view of one corner of the apparatus showing one method of interconnecting the housings and shutters on the respective sides of a screen to operate in unison;

Figure 6 is a section on line 6—6 of Fig. 5;

Figure 7 is a circuit diagram; and

Figure 8 is a detail section corresponding to Fig. 1 showing a modification.

The particular embodiment of the invention chosen for the purpose of illustration comprises a picture screen 1, a light housing 2 on each of the four sides of the screen, and a flaring shield 3 extending forwardly and outwardly from the regions of the housings 2, the shield 3 ordinarily being dark and forming a border for the projection screen 1.

As shown in Figs. 3 and 4 the light housings 2 comprise elongate casings having parallel front and rear sides 4 and 5, bottoms 6 and converging ends 7 and 8, the parts 8 being in the form of shutters pivoted to the fronts 4 at 9. At the bottom or rear of the housings is provided a cover 10 pivoted at 11 and held closed by catches 12, this cover serving to house the electrical conductors leading to the lamps 13 which are mounted on the bottom 6 as shown in Fig. 3. The pivot shafts 9 upon which the shutters 8 are mounted carry arms 16 by which the shutters may be opened and closed as hereinafter described, springs 9' being provided continuously to urge the shutters into closed position.

The front walls 4 of the housings are provided with slots 14 extending throughout the entire lengths of the housing, these slots carrying therein cylindrical lenses 15 which may be formed of opal or colored glass to form a light band extending entirely around the picture screen as shown in Fig. 1. Instead of locating the slots 14 in housings 2 they may be located in separate housings which may be located on the frame 3 as shown at 2' in Fig. 8, the housing 2' containing separate lights separately controlled so that the lighting effect of the slot may be controlled independently of the light suffused over the screen.

The supports for the housings 2 comprise inner shafts 17 and tubular shafts 18 rotating around the inner shafts. As shown in Fig. 4 the outer shafts are interrupted at intervals and at such intervals arms 16' fast to the inner shaft 17 extend radially into engagement with the arms 16 of the shutters 8. Bridging the aforesaid interruptions in the outer shaft 18 are crank arms 19 whereby the interrupted sections of the outer shaft are tied together and caused to rotate as a unit. The means for rotating the inner and outer shafts comprise segmental arms 20 and 21 which are connected to the shafts at 22 and 23 as shown in Fig. 4, the segmental arms carrying at their outer ends arcuate worm segments 24 and 25 which engage respectively with worms 26 and 27 (Figs. 1 and 5), the worms being driven through reduction gears by motors 28 and 29 respectively. The motors are independently controlled, preferably from the operator's booth, whereby the housings and shutters may be controlled independently. While the respective housings may each be provided with independent actuating means, for most purposes it is sufficient to have the housings operate in unison in which case they may be interconnected at the corners as shown in Fig. 5, the outer shafts 18 being interconnected by bevel gears 30 and the inner shafts 17 being interconnected by bevel gears 31, it being understood that the shafts may be thus interconnected at each of the four corners. The inner shafts may be journaled in bearings 32 at each of the four corners of the screen and the outer shafts are of course journaled on the inner shafts. In addition to the corner bearings 32 other bearings such as shown at 33 in Figs. 1 and 4 may be provided, these bearings surrounding the outer shafts 18 at intervals.

The housings 2 are mounted on the outer shafts as shown in Fig. 3, the housings having concave recesses fitting over the outer shafts and being held in this position by straps 35 extending around and secured to the shafts 18.

The screen 1 is preferably movable transversely of its plane so as to be in juxtaposition to the light housings in each at their adjusted positions. Moreover a curtain or other screen is preferably provided at the spaces 36 between the housings and the screen as indicated diagrammatically at 37 in Fig. 3 to prevent light in the rear of the screen from shining between the housings and the screen.

One circuit arrangement is shown in Fig. 7 in which the lights R are connected in parallel to a circuit $r$, the lights Y are connected in parallel to the circuit $y$ and the lights G are connected in parallel to the circuit $g$. The lights R may be red, the lights Y yellow and the lights G green, it being understood that many more lights than are shown in Fig. 7 would ordinarily be provided on each side of the screen as indicated by the breaks in the conductor at 38. The conductors $r$, $y$ and $g$ are connected to suitable sources of current through rheostats $r'$, $y'$ and $g'$ which are preferably located in the operator's booth so that the intensity and colors of the lights may be controlled by the operator or by an assistant. By varying the rheostats $r'$, $y'$ and $g'$, any desired intensity and color of light may be thrown on the screen and the distribution and intensity of the light can still further be controlled by rotating the housings 2 and their shutters 8.

I claim:

1. The method of enhancing the artistic effect of pictures projected upon a screen which comprises suffusing light over the pictures on the screen obliquely from the margins toward the center, and regulating the obliquity of the light to control its distribution.

2. In the projection of pictures on a screen, the combination with the screen of a light housing extending along the margin of the picture area, the housing having a window directed toward the picture area, and lights distributed along said margin within said housing, said housing having a light slot facing in the same direction as the screen in spaced relation to the margin of the picture area, thereby to display a band of light near said margin.

3. In the projection of pictures on a screen, the combination with the screen of a light housing outlining the picture area, the housing having a light slot facing in the same direction as the screen in spaced relation to the margin of the picture area, thereby to display a band of light around the picture.

4. In the projection of pictures on a screen, the combination with the screen of a light housing extending along the margin of the picture area, the housing having a window directed toward the picture area, lights distributed along said margin within said housing, and means associated with said window for varying the light emitted therethrough.

5. In the projection of pictures on a screen, the combination with the screen of a light housing extending along the margin of the picture area, the housing having a window directed toward the picture area, lights distributed along said margin within said housing, and an adjustable closure for said window whereby to vary the light emitted therethrough.

6. In the projection of pictures on a screen, the combination with the screen of a light housing extending along the margin of the picture area, the housing having a window directed obliquely toward the picture area, lights distributed along said margin within said housing, and means for rotating the housing about an axis parallel with said margin whereby to vary the obliquity of said window relatively to the picture area.

7. In the projection of pictures on a screen, the combination with the screen of an elongate light housing extending along the margin of each of a plurality of sides of the picture area, each housing having a longitudinal window directed toward the picture area, lights within the housings, shutters associated with the windows for varying the light emitted therethrough, and means for conjointly actuating said shutters.

8. In the projection of pictures on a screen, the combination with the screen of an elongate light housing extending along the margin of each of a plurality of sides of the picture area, each housing having a longitudinal window directed obliquely toward the picture area, and means for conjointly moving said housings simultaneously to vary the obliquity of the windows relatively to the picture area.

Signed by me at Boston, Massachusetts, this 2nd day of March, 1922.

SAMUEL PINANSKI.